United States Patent [19]

Langley et al.

[11] Patent Number: 5,054,713
[45] Date of Patent: Oct. 8, 1991

[54] CIRCULAR AIRPLANE

[76] Inventors: Lawrence W. Langley, 910 Cardinal Dr., Christiansburg, Va. 24073; Hal L. Moses, Rte. 1, Box 78, Newport, Va. 24128

[21] Appl. No.: 332,489

[22] Filed: Apr. 3, 1989

[51] Int. Cl.$^5$ .................... B64C 29/04; B64C 29/02; B64C 29/00
[52] U.S. Cl. ................... 244/12.2; 244/23 C; 244/73 B; 244/73 C
[58] Field of Search ................ 244/12.2, 23 C, 73 B, 244/73 C, 207

[56] References Cited

U.S. PATENT DOCUMENTS

| | | | |
|---|---|---|---|
| 2,807,428 | 9/1957 | Wibault | 244/23 C |
| 2,922,277 | 1/1960 | Bertin | 244/12.2 |
| 2,978,206 | 4/1961 | Johnson | 244/73 B |
| 3,041,009 | 6/1962 | Wharton | 244/12.2 |
| 3,073,551 | 1/1963 | Bowersox | 244/23 C |
| 3,104,853 | 9/1963 | Klein | 244/73 B X |
| 3,697,020 | 10/1972 | Thompson | 244/23 C X |

Primary Examiner—Margaret A. Focarino
Assistant Examiner—James M. Kannofsky

[57] ABSTRACT

The invention is a circular airplane with an oblately spheroidal body which derives lift from a wall or ribbon jet exhausting over its upper surface. The jet is produced by a mixed flow fan driven by an internal combustion or gas turbine engine within the body. A fixed guide van assembly removes the swirl from the outlet flow of the mixed flow fan. The jet exiting from the fixed guide vane assembly follows the curved surface of the body, exhausting downward, and produces lift. The magnitude of lift produced in each quadrant of the airplane may be reduced for thrust vectoring by flow control gates which partially block the flow of air from the fixed guide vane assembly. Rotation control vanes introduce a controlled swirl into the flow of air from the fixed guide vane assembly to effect rotation of the airplane. Actuators for flow control gates and rotation control vanes, and a flight control system, are provided.

19 Claims, 4 Drawing Sheets

CIRCULAR AIRPLANE

BACKGROUND OF THE INVENTION

A number of U.S. patents have been issued for circular aircraft configurations, embodying a variety of approaches to the generation of lift and control of attitude. Some of these patents teach levitation of a body by the direct thrust of single or multiple jets: more recent patents (e.g. U.S. Pat. Nos. 2,978,206, 2,996,266, 3,041,009, 3,276,723, 3,405,889, 3,592,413, 3,612,445, 3,697,020, and 3,785,592) utilize the flow of jets over the surface of wing-like structures. A review of these patents reveals that none of them contains predictions of load capacity, dimensions, power requirements, or the lift which would be generated by the configurations proposed. A review of the technical literature indicates that there have been no actual experiments with such craft, either tethered or in free flight.

During recent developments of VTOL and STOL aircraft, a great deal of analytical and experimental work has been performed on the behavior of jets exhausting parallel to lifting surfaces. For example, in a five-year study done by Rockwell ("A Study of Wall Jets and Tangentially Blown Wings", N. D. Malmuth, W. D. Murphy and J. D. Cole, Rockwell International Science Center—Report of ONR Contract N-0014-76-C-0350) the analysis of a jet exhausting over the upper surface of a wing was advanced to the point where subsonic and supersonic flows over a lifting surface could be modelled in detail, but no experimental verification was carried out. In their conclusions, the writers projected that more accurate results awaited further development of parabolic marching techniques.

At the David Taylor Naval Ship R&D Center, the controlled deflection of a large jet by a thin annular jet was investigated experimentally, ("Investigation of Parameters Influencing the Deflection of a Thick Wall Jet by a Thin Wall Jet Coflowing over a Rounded Corner", Gregory G. Huson, David Taylor Naval Ship R&D Center—Report DTNSRDC/ASED-83/10) with the indication that this is an effective means of vectoring thrust of a jet exhausting over the surface of a lifting body. Among the conclusions reached were that the effectiveness of this technique for thrust vectoring would be sensitive to the radius of curvature of the lifting surface, and to the relative upstream location of the main and control jets.

Further advances in the theory of turbulent wall jets were made in a study funded by ONR, conducted by Grumman Aircraft Corporation ("Theoretical Aerodynamics of Jets in Ground Effect Phase V—Asymptotic Theory of Turbulent Wall Jets", R. E. Melnik and A. Rubel, Grumman Aerospace Corporation—Final Report, Contract N00014-81-C-0549). The authors recommended experimental verification, but concluded that flows adjacent to a curved surface were difficult, if not impossible, to model. Papers in two recent AGARD Conferences have dealt with the subject of lift production by the combination of jets and adjacent surfaces, with particular application to VTOL and STOL aircraft. A session of the November 1981 conference was devoted to the topic "Jet Interactions with Neighboring Surfaces". In this session investigators from the University of Virginia ("An Experimental Investigation of an Upper Surface Blowing Configuration", G. D. Catalano, J. B. Morton and R. R. Humphris—AGARD November 1981) reported on laser velocimetry experiments performed with jets adjacent to a flat plate and to a flap upper surface. They were unable to project whether the jet would attach to the surface of the flap under static conditions.

The May 1984 AGARD Conference dealt with enhancement of lift by various means. One of the pertinent papers ("Modelling Circulation Control by Blowing", M. M. Soliman, R. V. Smith and I. C. Cheeseman, AGARD May 1984) was a study by Westland Helicopters of the lift and drag reduction effects of circulation control by blowing, on flows around circular bodies. The authors projected that the theory they developed would also predict the effects on lift of circulation control by blowing, for airfoils of any shape.

Applicants have been unable to find any references which deal with analytical prediction of lift for a circular aircraft, and no reports of experimental measurements on such craft. We decided to study the lifting characteristics of such a craft experimentally, and have developed a novel configuration which has a useful payload, can be controlled with stability and has operational utility. The report of our experiments is contained in "Circular Airplane Investigation", Final Report on Contract F33657-87-C-2164, Vatell Corporation, Apr. 18, 1988.

The principal difference between a helicopter and a circular airplane is in mechanical complexity. The rotor or rotors of a helicopter turn at a speed which is slow compared to that of the engine, and a gearbox is required to multiply the torque and reduce the speed of the engine. To control flight the pitch of the helicopter blades must be varied in two modes; all at once, to establish overall lift, and cyclically, to produce a lift vector and compensate for the effects on lift of horizontal motion through the air. The rotating main rotor blades produce a large torque in the horizontal plane on the helicopter, and in a single rotor craft this must be opposed by a separately controlled tail rotor. Multiple rotor helicopters balance the torque of one main rotor against that of the other to achieve cancellation and control vehicle rotation. The reference "New Aerodynamic Design of the Fenestron for Improved Performance", A. Vuillet and F. Morelli, AGARD Conference Proceedings No. 423, October, 1986 contains the statement: "The number of helicopters crashed due to failed or impacted tail rotors is about 0.15 per 10,000 hours of flight in the accident log book, as compared to a registered overall number of accident of 0.71 per 10,000 hrs of flight"

In "Summary of Drive-Train Component Technology in Helicopters", Gilbert J. Weden and John J. Coy, AGARD Conference Proceedings No. 369, January 1985, problems with the power transmission systems of helicopters are summarized: "Achievement of long-lived, reliable power transfer systems can be difficult to achieve and today's helicopters are one of the most severe applications of this technology. Helicopters (sometimes referred to as flying fatigue machines) present the ultimate test of materials and designs for reliability. The many failure mechanisms for bearing and gears must be weighed against anticipated loads which are not know with certainty. In addition to known classical modes of failure, such as pitting, scoring, and bending fatigue, there are unanticipated events that can ground helicopters. Things like sudden leaks producing low oil levels, undetected contamination of lubricant, and poor maintenance practices can severely lower the reliability of the mechanical components of the transmission."

By contrast, a circular airplane of the type we propose can be designed to operate with direct coupling (no gears) between its engine and fan, and has no rotor and no pitch controls. Any torque produced by the air flow which produces lift may be minimized by redirecting it with airfoils or vanes, so there is no need for a tail rotor or second main rotor. Flight control surfaces can be simple gates or dampers which modify the velocity distribution external to the craft. Rotation of the craft can be controlled by simple vanes which divert the main flow horizontally. Lift is controlled by engine speed, or for more rapid response may also be controlled by throttling the main lifting jet flow.

Applicants' circular airplane should be able to achieve a level of reliability which is close to that of its engine alone, because the components added for flight control are not highly stressed, and may even be designed for aerodynamic redundancy. In contrast, the flight control elements of the helicopter are among its most highly stressed, and have consequently high failure rates. An internal combustion engine power plant for a circular airplane would have the advantage that it operates at speeds which will allow direct coupling to the fan, although turboshaft or turbofan engines may ultimately prove to be practical, especially for larger craft.

A helicopter has its center of lift well above the center of gravity of the craft, and this produces a large righting moment which must be overcome by the cyclic pitch controls for any change in attitude. In applicants' circular airplane, the center of lift will be near the center of gravity, and the righting moment which must be overcome by vectoring of lift will be quite small.

The moment of inertia of the helicopter main rotor is quite large, and gyroscopic effects have a pronounced effect on maneuvering. In contrast, the moment of inertia of applicants' circular airplane will be much smaller, and only the rotating parts of the engine produce gyroscopic effects.

Because the helicopter blade moves a large volume of air at low pressure, it is efficient in generating lift. The circular airplane will be less efficient, because it moves a smaller volume of air at a higher velocity and pressure. The payload of a circular airplane will be less than that of a helicopter with the same fuel rate.

In general a helicopter is much more observable than a circular airplane will be, because of its greater size and the large rotating blade assembly. The circular airplane should have a small infrared signature because its heated exhaust can be mixed with a much larger volume of air. The vehicle body may be constructed of reinforced plastics which have a low radar reflectivity. The noise of a circular airplane will be limited to that of its engine and the fan it drives, and vibration can be minimal, depending on how well these components are balanced. Noise reaching the ground should be extremely low, in fact this vehicle may be almost as quiet as a glider because the body will shield engine noise from the ground and the jet velocity around the body of the vehicle will be relatively low. All high speed, turbulent mixing will occur above the vehicle.

In "Minimisation of Helicopter Vibration Through Active Control of Structural Response", S. P. King, A. E. Staple, AGARD Conference Proceedings No. 423, October, 1986 the problem with vibration in helicopters is succinctly described, "The control of vibration has been and remains, a problem for all rotary winged vehicles. Considerable efforts have been expended over many years in attempts to reduce vibration to acceptable levels. On the helicopter there are many sources of vibration, but the most important component is generated by the main rotor and occurs at a frequency (bR) equal to the product of the number of blades (b) and the rotor speed (R). This blade passing frequency vibration is an inherent consequence of driving a rotor edgewise through the air, and can never be completely eliminated, although the magnitude of the rotor excitation can be controlled by careful rotor system design. The response of the air frame is also sensitive to the dynamic characteristics of the fuselage, and again careful design can minimize the response. As understanding of the nature of the problem has increased, and the ability to predict the dynamic response of both rotor and airframe has improved, it has become possible to design a helicopter for low vibration, or at the very least to avoid those problems which have led to very high vibration in the past. The trend for increased cruise speed, and mission endurance has, however, aggravated the problem, since the magnitude of the rotor vibratory loads increases with speed, and the effect of vibration on human fatigue is proportional to exposure time."

Little can be said about the relative speeds in horizontal flight of helicopters and circular airplanes. Helicopters have a fundamental limitation: the backwardly moving rotor blades produce less lift than those moving in the direction of travel. At some limiting speed the backwardly moving blades will stall, and the helicopter cannot approach this speed with safety.

While circular airplanes may not have advantages over helicopters in vertical takeoff and landing, they may be able to make the transition to horizontal flight more easily, and may be ultimately capable of higher speeds than helicopters. Horizontal flight characteristics of applicants' circular airplane are unknown, but its speed will probably be limited to less than the exit velocity of the main jet. With certain vehicle profiles a scheme for diverting all of the flow to one side of the vehicle may make it possible to achieve high speed horizontal flight, but this remains to be explored.

The helicopter applications for which applicants' circular airplane may be most attractive are those which require:

(1) reliability;
(2) maneuverability;
(3) small payload;
(4) low vibration; and
(5) low observability.

Among military applications the one which immediately stands out is the battlefield reconnaissance mission. Here the ability to operate from a small base is crucial, and the circular airplane has a real advantage. It will be able to take off and land in a space not much larger than its own area with greater safety than a helicopter, whose rotating blades are extremely hazardous to personnel.

Reconnaissance missions may be separated into manned and unmanned types. In the former, the payload consists of a pilot, sensors, computers and communications equipment. A typical payload might be 500 to 1000 pounds, and flight times of 1-3 hours are typical of tactical applications, mostly in slow speed, level flight. There is a strong trend towards the use of remotely piloted vehicles for reconnaissance. In these applications the payloads are smaller, but other requirements are the same. "Mini-helicopters", powered by internal combustion engines, have been developed for this use, but they have all the complexity, and most of the control problems, of larger helicopters and are extremely limited in payload and endurance.

In the commercial and industrial marketplace the prospects for circular airplane applications are similar. While a circular airplane may never be used for heavy lifting, there are surveillance and monitoring tasks now performed by helicopters which it could do better. Providing a truly maneuverable but steady platform for aerial photography, a remotely piloted circular airplane could be launched from the back of a pickup truck and directed to take photographs from a variety of angles. It could be used for observation of forest fires, natural and man-induced disasters, and routine traffic and crime surveillance. With a laser beam projected from a ground station, this type of craft could be directed to a fixed position over its objective, perform its mission, then be brought back to the launching site in a "beam riding" mode with the exposed film or recorded data.

These and other advantages are achieved in applicants' circular airplane configuration, which is herein disclosed and described in detail.

DETAILED DESCRIPTION OF THE PREFERRED EMBODIMENT

Figure 1:
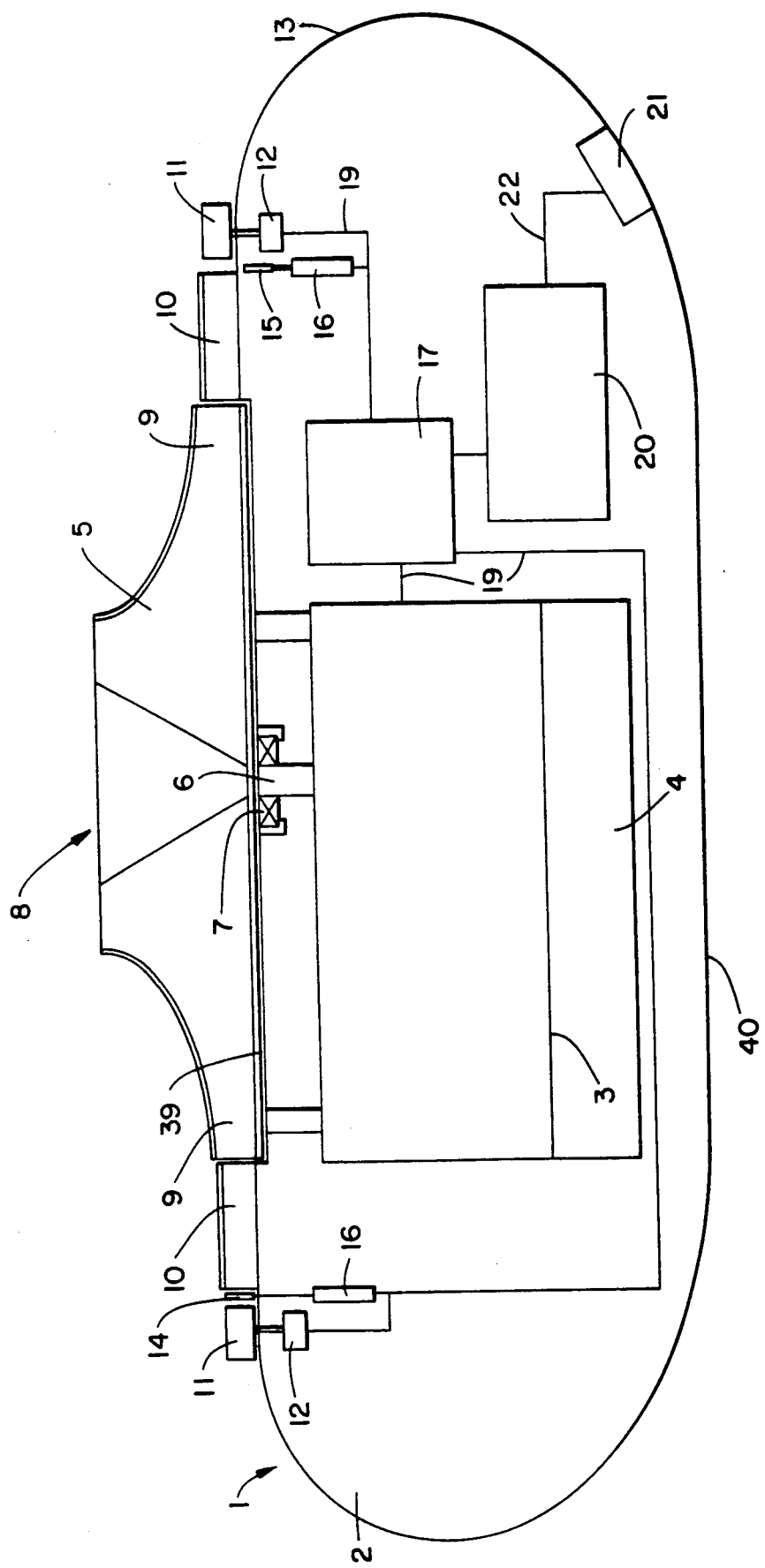
FIG. 1 is a sectional, partly schematic view of the circular aircraft which shows its main propulsion means and control surfaces.

FIG. 1 is a sectional view of applicant's invention, with some parts shown schematically. As shown in this figure, circular airplane 1 comprises an oblately spheroidal body 2 whose major diameter is in the horizontal plane. The top surface 39 and bottom surface 40 of the spheroid are shown in this view to be planar, but this is not critical to the proper functioning of the invention. The body 2 houses a prime mover 3, a supply of fuel 4, and a mixed flow fan 5. A mixed flow fan induces the air flow along lines parallel to its axis of rotation and discharges the air flow radially, accomplishing turning of the flow within the body of the fan. The mixed flow fan is connected to the prime mover by a shaft 6, supported by a bearing 7. The inlet end 8 of the fan faces upward. When the fan is rotated by the prime mover, air is drawn down into the fan by its axial blades and then discharged from the fan outlet 9 by centrifugal force. Whirling motion of the air discharged by the fan is corrected by fixed guide vane assembly 10.

The airplane is equipped with two or more rotation control vanes 11 which can be rotated about their vertical axes by actuators 12. These vanes are positioned in a coordinated manner so as to divert the flow of air from the fixed guide vane assembly 10 either clockwise or counter-clockwise around the airplane's vertical axis, thus influencing its rotation about that axis.

The air flow from the fixed guide vane assembly discharges horizontally, but then curves downward, following the smoothly curved outer contour 13 of the body 2. This generates lift by a combination of effects which will be described in detail later in this disclosure. The amount of lift is approximately proportional to the mass flow rate of air. The direction of lift relative to the vertical axis of the airplane is controlled by four gates, two of which (14, 15) are shown in this view. Each gate is controlled by an actuator 16, and may be moved by its actuator between a raised position, as shown for gate 14, and a lowered position, as shown for gate 15. In the fully raised position the gate partially blocks the flow of air from one side of the fixed guide vane assembly 10, reducing the lift on that side. Thus the net direction of lift is controlled by gate positions, allowing the airplane to be tilted in any direction during flight.

Operation of the rotation control vanes and the gates is under command of a flight control computer 17, which also controls the speed of the prime mover 3. Sensing and power signals for actuators 12 and 16 and the prime mover 3 are conducted by a wiring harness 19. A mission computer 20 determines the flight path of the airplane, responding to stored instructions and to signals from a sensing array 21, which is interconnected to the mission computer 20 by a wiring harness 22.

Figure 2:
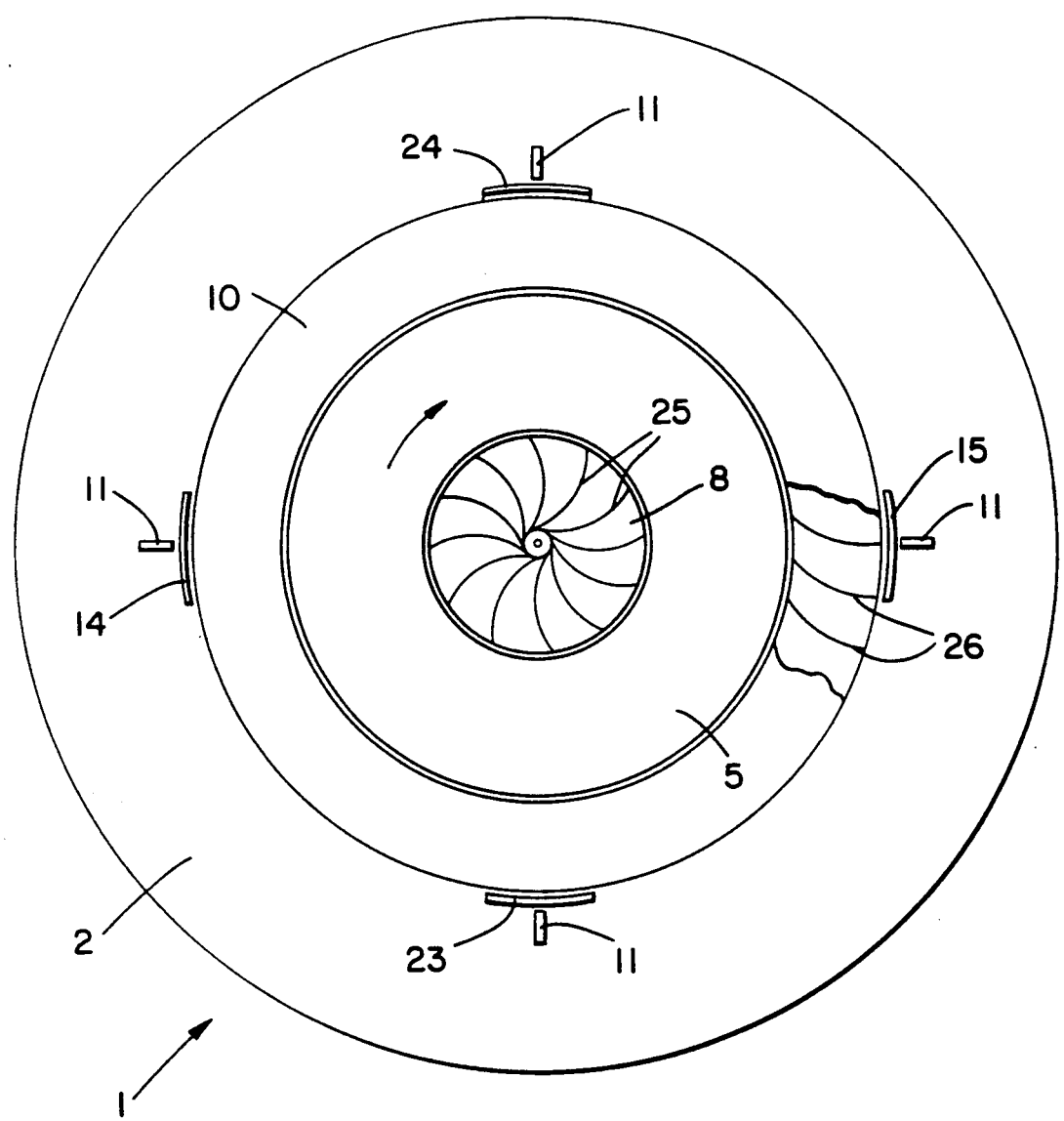
FIG. 2 is a partially cutaway top view of the circular aircraft which shows further details of the control surface arrangement.

FIG. 2 is a partially sectional top view illustrating further details of the invention. Locations of the four rotation control vanes 11 and of the gates 14, 15, 23 and 24 are clearly shown. Fixed guide vane assembly 10 is shown partially in cutaway to illustrate the fixed guide vanes 26, which receive the swirling air flow from the mixed flow fan 5 and discharge it in a radial direction. This view also shows the blades 25 of the mixed flow fan 5, visible from its inlet end.

Referring to FIGS. 1 and 2, the operation of the invention will now be described in detail.

To achieve stable flight, a circular airplane must (a) develop lift which is controllable over a range of values which includes the gross weight of the airplane, (b) control tilt of the airplane about two horizontal axes, and (c) control airplane rotation about its vertical axis. To generate lift, it is necessary for the airplane to accelerate a mass flow of air downward and maintain a positive pressure difference from the bottom to the top surfaces of the airplane. The effective lift is a result of both these effects, but it may be confusing to state that the lift is a summation of the two. The lift may be fully characterized as a mass acceleration effect or as a pressure effect, or (less precisely) as a combination of the two. A "pressure component" of lift and an "acceleration component" of lift may be derived, but the division between them is arbitrary and their sum is always the same. Thus there are two precise ways to describe how the circular airplane develops its lift; as a pressure effect or as a mass acceleration effect. Each is a complete description of the lift principle of the invention.

The generation of lift by mass acceleration for the invention may be described as follows. A mass of still air above the aircraft is accelerated into the inlet 8 of the mixed flow fan 5 and then discharged radially and horizontally through fixed guide vane assembly 10. The mass flow exits as a thin high velocity horizontal ribbon jet with energetic mixing occurring at both top and bottom surfaces. The mixing process will entrain additional mass flow from the surrounding air into the jet and cause it to decelerate and increase in thickness. Absent the curved surface 13 of the airplane, the jet would continue horizontally and dissipate the energy imparted to it by the mixed flow fan uniformly in all directions. However, the surface 13 prevents entrainment of surrounding air by the lower surface of the jet, so a pressure differential is created across the jet and it turns downward, following the curvature of the surface. As the jet turns, it mixes even more energitically on its upper and outer surface, entraining still air and increasing the mass flow even further. Lift is generated by the net acceleration of the air mass through the mixed flow fan and the acceleration of the surrounding air mass which mixes with the jet. The amount of lift may be determined by measuring and integrating the velocity profile of the resulting vertical flow.

The generation of lift by pressure for the invention may be described as follows. The mixed flow fan 5 ingests air from above by creating a region of lowered pressure over the area of its inlet 8. The air discharged from fixed guide vane assembly 10 entrains air from the surroundings by energetic mixing, and creates a net negative pressure across the entire top area of the airplane. Some of the air discharged from the airplane curves completely around the body 2, creating a slight positive pressure underneath it. The lift of the circular airplane may be determined by measuring and integrating the pressure distribution over its entire surface.

Lift measurements or computations made by the two methods above should yield the same value.

The preferred embodiment of applicants' invention generates a greater amount of lift for a given horsepower than circular airplanes described in the reference because (a) the mixed flow fan 5 is more efficient in imparting momentum to the air and (b) the smooth contour of the surface 13 is optimum for turning the resulting flow downward and inducing energetic mixing of the ribbon jet with the surrounding air. Computer codes developed by applicants to predict lift for the aircraft, incorporating empirical values derived from actual experiments, indicate that the lift of this airplane will be in excess of 4 lbs. per horsepower. This is sufficient to allow use of a conventional internal combustion engine, although the payload and range for such a craft would be limited. With a gas turbine prime mover, more useful payloads and improved ranges would be achieved.

While development of lift is important for a flight capability in a circular airplane, the ability to vector the lift is equally important for airplane attitude and flight control. The preferred embodiment of applicants' invention achieves this by differential control of the mass flow of air around the body 2. We have experimentally determined that a reduction of mass flow on one side of a circular aircraft will result in a reduction of the lift generated on that side. Thus it is possible to create a vectoring of thrust by partially blocking the jet on one side. This is the function of gates 14, 15, 23 and 24 and actuators 16. When it is desired to tilt one side of the aircraft downward, the gate on that side is raised into the jet, and lift on that side will be reduced. Net lift for the whole airplane will not be significantly reduced, because the flow to other sides of the aircraft will increase slightly.

Applicants' preferred embodiment circular airplane controls rotation about its vertical axis by re-introducing swirl in the lifting jet flow. Rotation control vanes 11 divert part of the flow from a radial direction to exit at an angle from the radial line. The four rotation control vanes are actuated together, producing a net torque on the body of the airplane.

The prime mover 3 of applicants' preferred embodiment is an internal combustion engine, preferably a 2-cycle, lightweight engine producing 1 horsepower per pound of gross weight. Such an engine will operate reliably for long periods at 6,000 to 8,000 rpm, and will produce sufficient torque to drive a 24" diameter mixed flow fan with good efficiency. A small gas turbine engine would produce greater horsepower in the same weight, but applicants are not aware of any such engines in this small size. An oscillating rotary vane engine patented by Robert K. Cordray (U.S. Pat. No. 4,605,361) would produce even greater horsepower per pound, but the reliability of this engine is unknown.

The supplying of air and fuel and elimination of heat and exhaust products of the prime mover for the circular airplane are subject to ordinary engineering by those skilled in the art of aircraft design.

Applicants' preferred embodiment circular airplane is designed to perform as a remotely piloted, or unmanned autonomous vehicle. To that end, it is equipped with a mission control computer 20, a flight control computer 17, and a sensor or array of sensors 21. The flight control computer 17 maintains stability of the airplane and determines which actuators will be operated to cause it to follow a commanded flight path. The function of the mission control computer 20 is to command the airplane through its intended path for performance of surveillance or other tasks. Signals from the sensor array 21 will be detected, analyzed and stored, either to determine the flight path or for later analysis by ground facilities. The airplane may be equipped with a communication link to facilitate remote piloting or modification of the mission or downloading of data from the sensors. The variety of missions and equipment configurations possible is beyond the scope of this disclosure.

CIRCULAR AIRPLANE LIFT EXPERIMENTS

The practicality of a circular airplane hinges on its having sufficient lift and on the existence of some means for control of the lift vector. Applicants performed an experimental study whose objective was to investigate the lift and control characteristics of a circular aircraft configuration. Air flows around such an aircraft, driven by an annular jet exhausting over the upper surface, were studied experimentally and analyzed by computer modelling. The experimental results were then used to determine the mixing length constants of the computer model, in order to develop an analytical/empirical method for calculating the flows, pressures and lift characteristics of a circular aircraft. Thrust vectoring methods were also explored.

Figure 3:
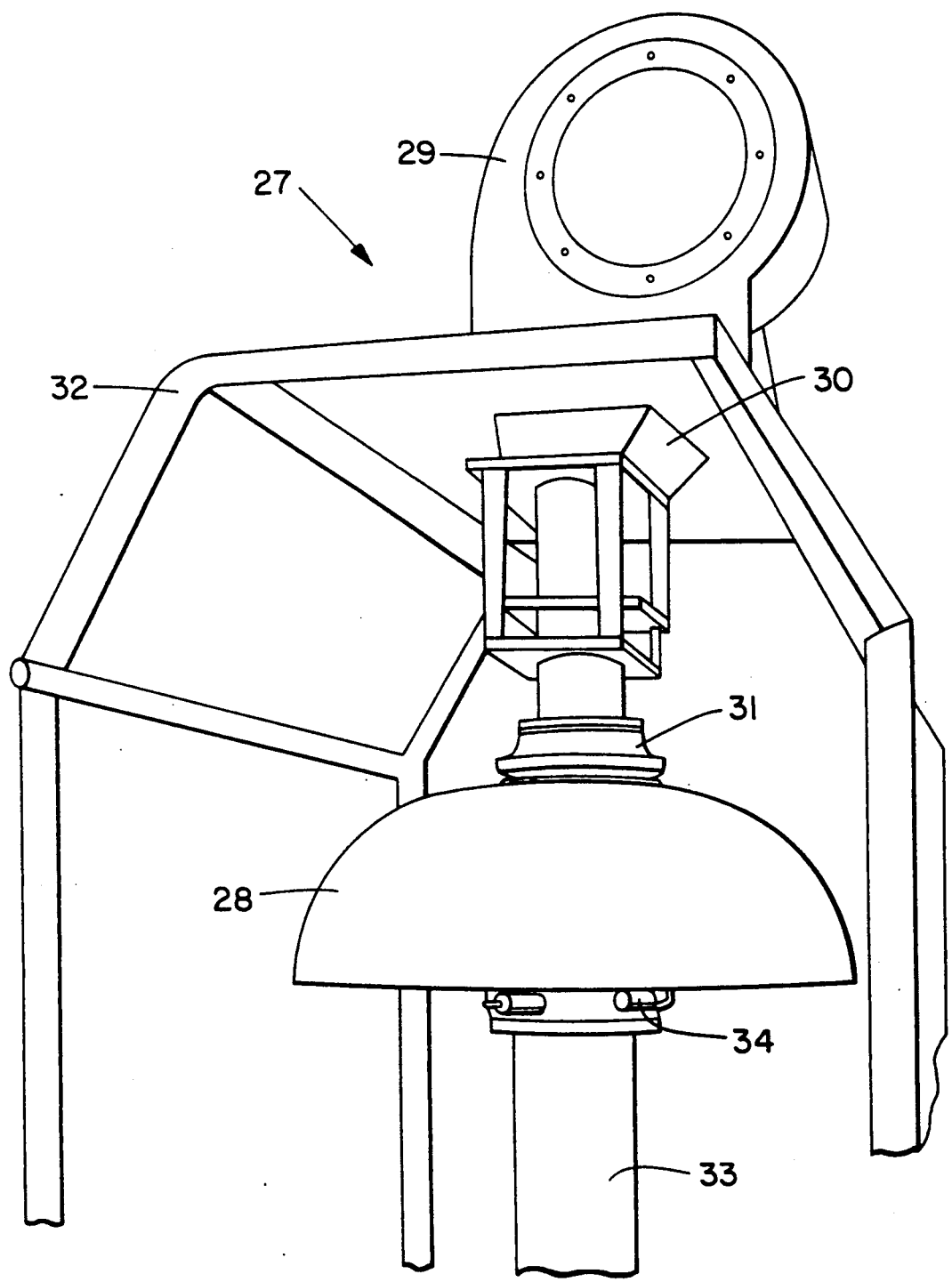
FIG. 3 is a perspective view of the experimental apparatus which was used to measure lift and explore controllability of the circular aircraft.

FIG. 3 shows the experimental apparatus 27 used in this investigation. The aircraft model 28 is a 36 inch diameter, 12 inch high spun aluminum body, formed from a flat plate ¼ inch thick. The model has a flat top 12 inches in diameter, and jet attachment surfaces with a circular profile and an inside radius of 12 inches. Suspended above the model is an air supply, consisting of an electrically driven Aerovent type 450BI centrifugal blower 29 and a transition duct 30 which conducts the air from the rectangular outlet of the blower to a 12 inch diameter horizontal jet-forming nozzle 31 centered over the flat top of the model. The blower and transition pipe are suspended above the model by a rigid pipe framework 32 which is lagged to the concrete floor of the laboratory. The model is mounted immediately below the jet-forming nozzle on a pedestal 33, also lagged to the floor. The model is supported on the pedestal by four Tedea 305E 5 Kg. capacity load cells 34.

Figure 4:
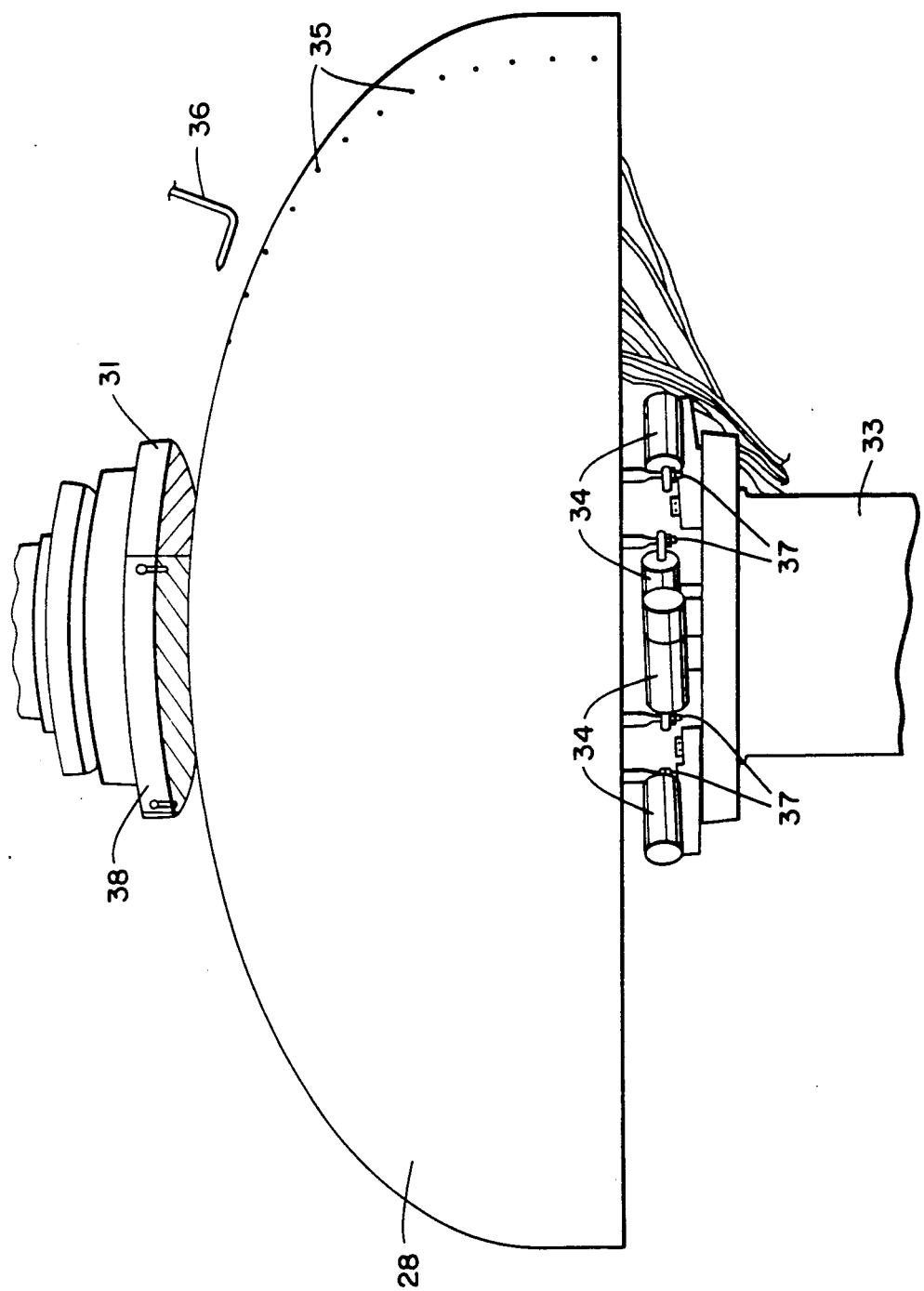
FIG. 4 is a perspective view of the experimental model showing the static pressure taps which were used to measure pressure forces on the model, and the gate used in experiments to vector the thrust of the model.

As illustrated in FIG. 4, the model has 19 pressure taps 35, installed in and flush with the upper surface. Ten of these taps are spaced along a streamline at 2 inch intervals; the first one located just under the lip of the nozzle 31 and the last at the extreme skirt of the model. The remaining nine taps (not shown) are on streamlines displaced 90°, 180° and 270° from the line of the first ten taps, and are at approximately 6 inch intervals along their respective streamlines. Pressures from these taps were all measured by an inclined water manometer (not shown).

A movable total pressure probe 36, mounted on an ICL 2 inch travel micrometer-driven dovetail slide (not shown), is connected to another tube of the manometer. The slide is mounted on an adjustment plate and support rod (not shown), which allow it to be positioned anywhere in relation to the model surface.

Each of the load cells 34 supports a quadrant of the model on a vertical adjustment screw jack 37 which can be used to adjust (a) the height of the model above the pedestal 33, (b) its angle relative to the jet-forming nozzle 31, and (c) the proportion of the total weight supported by the individual load cell.

After assembly of the experimental apparatus, applicants calibrated the load cells in place using a measured weight suspended from the ball socket which normally supports the model. Constants were then calculated for use in compensating for the individual cell zero offset and gain. The nozzle height was adjusted and the final opening measured and recorded for each quadrant, using a dial caliper. The whole model was then raised to a point just short of touching the bottom of the nozzle, and leveled. A final adjustment approximately equalized the static force supported by each load cell to just under 4 Kg. The gap between the top of the model and the top surface of the nozzle lower lip was then measured and recorded.

At each nozzle height setting the initial data taken were the quiescent manometer readings and static force values. These were recorded and the blower was turned on. Manometer static pressure readings and the forces on the model were then recorded. At each of three or four positions along the model surface a total pressure profile was measured, using the movable probe 36. In all cases measurements started at the model surface and continued as far away from the surface as necessary to record the full velocity profile.

In an attempt to cause the jet to separate from the model surface, the model was lowered in increments until there was a 0.75 inch gap between it and the bottom of the nozzle. At this point the jet was still attached. The lift force decreased from 3.41 Kg. to 3.05 Kg. with a nominal nozzle opening of 0.625".

Applicants investigated thrust vectoring by attaching a 9.5 inch long, 4 inch high clear plastic gate 38 to one quadrant of the nozzle. The gate was moved in increments from a fully open position to fully closed, and force measurements were taken with the load cells.

The experiment and analysis clearly indicate feasibility for an aircraft based on this principle. A lift to power ratio of between 5 and 7 lbs./hp. seems to be possible for a configuration like the one tested. The lift can be vectored by simple means and controlled in magnitude by adjusting the speed of the prime mover. Rotational control was not investigated.

VARIATIONS UPON THE PREFERRED EMBODIMENT

While the circular airplane of applicants' preferred embodiment is configured as a remotely piloted or unmanned autonomous vehicle, other configurations are possible, for the performance of other missions. For example, a scaled-up version of the circular airplane could carry a person for short distances at low altitudes. This would be a "personal" airplane, used for recreational or business purposes. In larger sizes the circular airplane might be used as a cargo or passenger carrier.

The prime mover described as part of the preferred embodiment is an internal combustion engine, for which many alternatives exist. A gas turbine could be used to drive the mixed flow fan, either directly or through a gearbox. The exhaust flow of the gas turbine could be directed downward from the body of the airplane or combined with the lifting jet flow to dilute it to lower temperatures. A rotary engine such as the Wankel might provide a higher power to weight ratio than the piston engine, with acceptable reliability. Alternatively, an electric motor could be used, particularly for tethered flight applications, with electric power transmitted to the airplane by wire, microwave, or other directed beams.

In FIG. 2 the gates 14, 15, 23 and 24 and rotation control vanes 11 are shown to be in the same quadrants of the airplane. This arrangement concentrates structural and electrical components in four areas, but may create interference between the controls. For example, the authority of a rotation control vane 11 is reduced when its corresponding gate is raised. To reduce this effect with a slight increase in vehicle weight, the rotation control vanes may be located midway between the gates.

To enable more agile maneuvering, such as might be required by a military forward artillery observer application, the gates 14, 15, 23 and 24 and rotation control vanes 11 may be increased in size. This will increase their authority and increase the rotary accelerations that are possible for the vehicle. There are also alternatives to gates as a means of modulating the lift forces in quadrants of the aircraft. For example the ribbon jet may be caused to separate from the curved surface (13, FIG. 1) in a quadrant of the body by a flow of pressurized air through a slot at the same position as the gate slot (see Huson, op. cit.). Alternatively the curvature of the surface may be changed abruptly by raising a flap downstream of the fixed guide vane assembly. Any means which causes the flow over a quadrant of the airplane to be reduced, or which causes the flow to separate in a quadrant, can be used to vector the thrust.

The actuators 16 recited as part of the preferred embodiment circular airplane may be hydraulic cylinders, hydraulic vane motors, integrated electro-hydraulic or electromechanical actuation devices. If hydraulic, the vehicle must have a source of hydraulic power, otherwise the actuators may be energized directly by electric power.

While a mixed flow fan is believed to be best for its combination of light weight and efficiency, with higher speed prime movers such as gas turbines an axial flow fan and nozzle combination may prove to be more effective. The trade-off in this case is engine weight against propulsive efficiency: the lighter engine operates at higher speeds, possibly too high for a mixed flow fan, but the axial flow fan is less efficient. A gearbox, with its added weight, losses and limited life, may be the best way to match the gas turbine and the mixed flow fan.

Structural materials for applicants' circular airplane must have a high strength to weight ratio. Candidate materials are carbon fiber reinforced carbon composites, aluminum lithium alloys, and the more conventional fiberglass reinforced epoxy resins, honeycomb metals, balsa wood laminates and the like. For weight minimization the prime mover will be the structural nucleus of the airplane, with most components attached to it directly.

From the foregoing it is clear that applicants' invention may be practiced in many forms by those knowledgeable in the art of aircraft design without departing from the spirit and scope of this disclosure.

We claim:

1. An airplane having a nearly circular plan form, comprising:
   an oblately spheroidal hollow aerodynamic body with its smallest dimension vertical and its largest dimension horizontal, having an aperture at the center of its upper surface;
   an engine mounted within said aerodynamic body having a vertical output shaft extending upwards through said aperture;
   a mixed flow fan rotatably attached to the end of said output shaft having its axial induction opening facing upward and its bottom surface flush with the upper surface of said aerodynamic body;
   a guide vane assembly for removing the swirl from the discharge of said mixed flow fan, fixedly mounted to the upper surface of said aerodynamic body, surrounding and closely coupled to the discharge opening of said mixed flow fan, wherein said discharge flow exiting said guide vane assembly follows the external contour of said aerodynamic body and is directed essentially vertically downward, producing aerodynamic lift;
   means for adjustably reducing the flow of said mixed flow fan over a sector of its radial discharge opening;
   means for adjustably imparting a swirl to part of the discharge flow of said guide vane assembly; and
   means for controlling the speed of said engine.

2. The device of claim 1 in which said upper surface of said aerodynamic body is a horizontal plane and said discharge flow of said guide vane assembly exits horizontally.

3. The device of claim 1 in which said upper surface of said aerodynamic body is convexedly curved and said discharge flow of said guide vane assembly exits with a downward component of velocity.

4. The device of claim 1 in which said means for adjustably reducing the flow of said mixed flow fan is a gate adjustably raised across the discharge opening of said guide vane assembly.

5. The device of claim 1 in which said means for adjustably imparting a swirl to part of the discharge flow of said guide vane assembly is a vane adjustably rotated in said discharge flow.

6. The device of claim 1 further comprising flight control means connected to said means for adjustably reducing the flow of said mixed flow fan over a sector of its radial discharge opening, to said means for adjustably imparting a swirl to part of the discharge flow of said guide vane assembly and to said means for controlling the speed of said engine, for controlling the flight path of said airplane.

7. The device of claim 6 further comprising mission command means connected to said flight control means, for predetermining the flight path of said airplane.

8. The device of claim 7 further comprising sensor means connected to said mission command means for detecting signals and conditions from the environment of said airplane.

9. An unmanned autonomous vehicle having a nearly circular plan form, comprising:
   an oblately spheroidal hollow aerodynamic body with its smallest dimension vertical and its largest dimension horizontal, having an aperture at the center of its upper surface;
   an engine mounted within said aerodynamic body having a vertical output shaft extending upwards through said aperture;
   a mixed flow fan rotatably attached to the end of said output shaft having its axial induction opening facing upward and its bottom surface flush with the upper surface of said aerodynamic body;
   a guide vane assembly for removing the swirl from the discharge of said mixed flow fan, fixedly mounted to the upper surface of said aerodynamic body, surrounding and closely coupled to the discharge opening of said mixed flow fan, wherein said discharge flow exiting said guide vane assembly follows the external contour of said aerodynamic body and is directed essentially vertically downward, producing aerodynamic lift;
   means for adjustably reducing the flow of said mixed flow fan over a sector of its radial discharge opening;
   means for adjustably imparting a swirl to part of the discharge flow of said guide vane assembly;
   means for controlling the speed of said engine;
   flight control means connected to said means for adjustably reducing the flow of said mixed flow fan over a sector of its radial discharge opening, to said means for adjustably imparting a swirl to part of the discharge flow of said guide vane assembly and to said means for controlling the speed of said engine, for controlling the flight path of said vehicle;
   mission command means connected to said flight control means, for predetermining the flight path for said vehicle; and
   sensor means connected to said mission command means for detecting signals and conditions from the environment of said vehicle.

10. The device of claim 9 in which said upper surface of said aerodynamic body is a horizontal plane and said discharge flow of said guide vane assembly exits horizontally.

11. The device of claim 9 in which said upper surface of said aerodynamic body is convexedly curved and said discharge flow of said guide vane assembly exits with a downward component of velocity.

12. The device of claim 9 in which said means for adjustably reducing the flow of said mixed flow fan is a gate adjustably raised across the discharge opening of said guide vane assembly.

13. The device of claim 9 in which said means for adjustably imparting a swirl to part of the discharge flow of said guide vane assembly is a vane adjustably rotated in said discharge flow.

14. A vertical takeoff and landing vehicle having a nearly circular plan form, comprising:

an oblately spheroidal hollow aerodynamic body with its smallest dimension vertical and its largest dimension horizontal, having an aperture at the center of its upper surface;

an engine mounted within said aerodynamic body having a vertical output shaft extending upwards through said aperture;

a mixed flow fan rotatably attached to the end of said output shaft having its axial induction opening facing upward and its bottom surface flush with the upper surface of said aerodynamic body;

a guide vane assembly for removing the swirl from the discharge of said mixed flow fan, fixedly mounted to the upper surface of said aerodynamic body, surrounding and closely coupled to the discharge opening of said mixed flow fan, wherein said discharge flow exiting said guide vane assembly follows the external contour of said aerodynamic body and is directed essentially vertically downward, producing aerodynamic lift;

means for adjustably reducing the flow of said mixed flow fan over a sector of its radial discharge opening;

means for adjustably imparting a swirl to part of the discharge flow of said guide vane assembly; and means for controlling the speed of said engine.

15. The device of claim 14 in which said upper surface of said aerodynamic body is a horizontal plane and said discharge flow of said guide vane assembly exits horizontally.

16. The device of claim 14 in which said upper surface of said aerodynamic body is convexedly curved and said discharge flow of said guide vane assembly exits with a downward component of velocity.

17. The device of claim 14 in which said means for adjustably reducing the flow of said mixed flow fan is a gate adjustably raised across the discharge opening of said guide vane assembly.

18. The device of claim 14 in which said means for adjustably imparting a swirl to part of the discharge flow of said guide vane assembly is a vane adjustably rotated in said discharge flow.

19. The device of claim 14 further comprising flight control means connected to said means for adjustably reducing the flow of said mixed flow fan over a sector of its radial discharge opening, to said means for adjustably imparting a swirl to part of the discharge flow of said guide vane assembly and to said means for controlling the speed of said engine, for controlling the flight path of said vehicle.

* * * * *